United States Patent [19]
Bergmann et al.

[11] Patent Number: 5,142,867
[45] Date of Patent: Sep. 1, 1992

[54] COMPOUND TURBO-DRIVE FOR AN INTERNAL-COMBUSTION ENGINE

[75] Inventors: Horst Bergmann, Esslingen; Günter Fischer, Stuttgart; Wolfgang Büschel, Fellbach, all of Fed. Rep. of Germany

[73] Assignee: Daimler-Benz AG, Fed. Rep. of Germany

[21] Appl. No.: 479,167

[22] Filed: Feb. 13, 1990

[30] Foreign Application Priority Data

Mar. 14, 1989 [DE] Fed. Rep. of Germany ....... 3908286

[51] Int. Cl.⁵ .......................................... F02B 37/00
[52] U.S. Cl. ........................................ 60/612; 60/624
[58] Field of Search .................. 60/612, 624; 415/102

[56] References Cited

U.S. PATENT DOCUMENTS

| | | | |
|---|---|---|---|
| 1,309,549 | 6/1919 | Sherbondy | 60/612 |
| 1,310,682 | 7/1919 | Sherbondy | 60/612 |
| 2,359,615 | 10/1944 | Bronne | 60/612 |
| 2,585,968 | 2/1952 | Schneider | 60/624 |
| 2,624,173 | 1/1953 | Bloomberg | 415/102 |
| 2,739,440 | 3/1956 | Seifert | 60/612 |
| 3,027,706 | 4/1962 | Sprick | 60/612 |
| 4,400,945 | 8/1983 | Deutschmann | 60/612 |
| 4,464,902 | 8/1984 | Mendle | 415/102 |
| 4,538,574 | 9/1985 | Lombardi | 60/612 |

FOREIGN PATENT DOCUMENTS

| | | |
|---|---|---|
| 0136541 | 10/1985 | European Pat. Off. . |
| 962764 | 4/1957 | Fed. Rep. of Germany . |
| 1020494 | 12/1957 | Fed. Rep. of Germany . |
| 3514814 | 10/1985 | Fed. Rep. of Germany . |

Primary Examiner—Richard A. Bertsch
Assistant Examiner—Peter Korytnyk
Attorney, Agent, or Firm—Evenson, Wands, Edwards, Lenahan & McKeown

[57] ABSTRACT

The invention relates to a compound turbo-drive for a two cylinder bank V-form internal-combustion engine with an exhaust-gas turbocharger for each cylinder bank that together feed a re-expansion turbine. To obtain a space-saving arrangement, the re-expansion turbine has a double-flow turbine housing with two integrated side inlet housings to which the exhaust-gas turbines of the exhaust-gas turbochargers are arranged horizontally.

10 Claims, 1 Drawing Sheet

U.S. Patent
Sep. 1, 1992
5,142,867
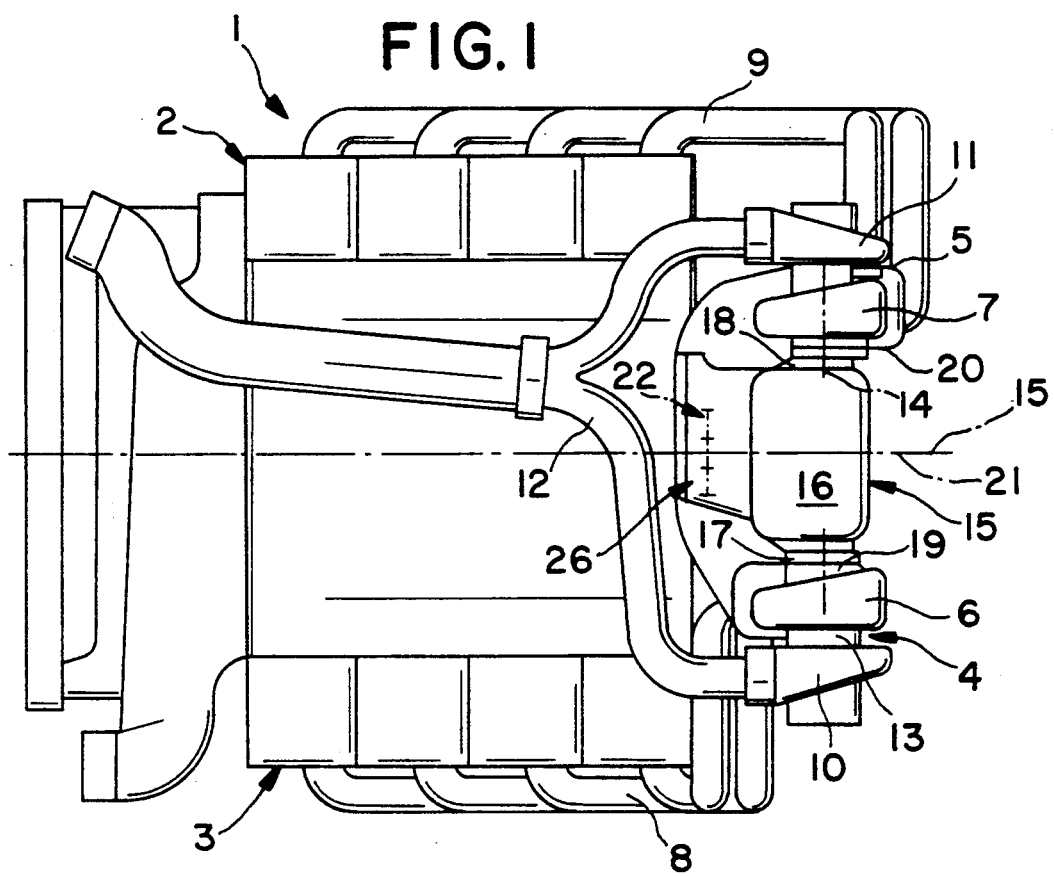
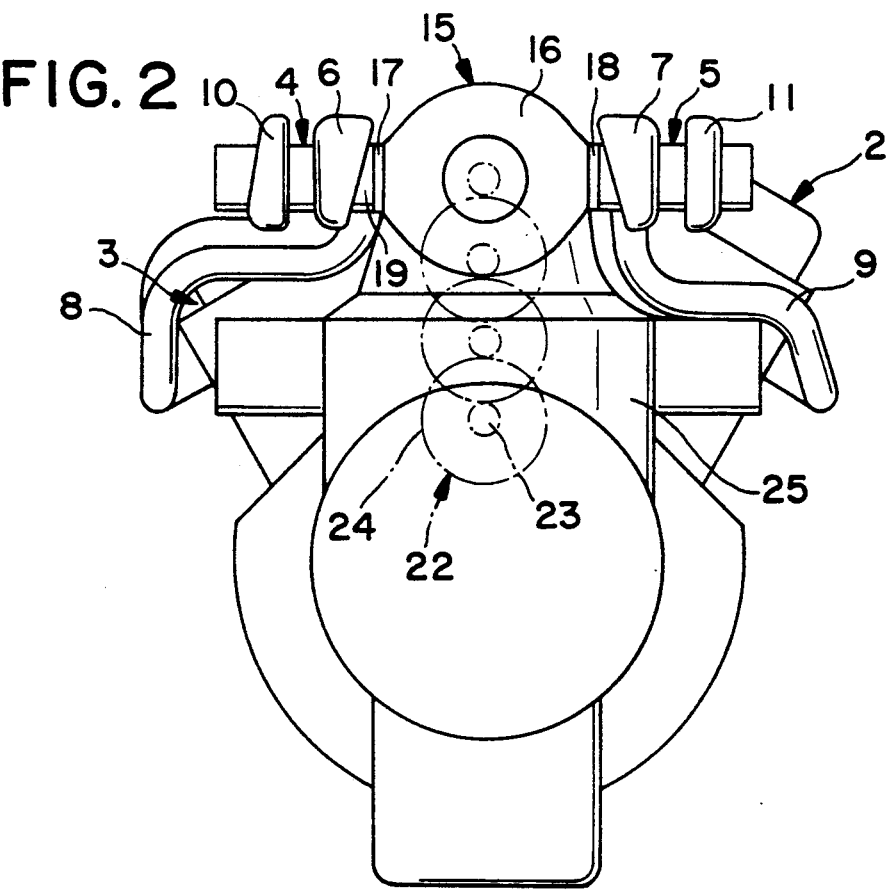

5,142,867

COMPOUND TURBO-DRIVE FOR AN INTERNAL-COMBUSTION ENGINE

BACKGROUND AND SUMMARY OF THE INVENTION

The invention relates to a compound turbo-drive for an exhaust-gas turbocharger and re-expansion turbine of an internal-combustion engine. The re-expansion turbine is connected to drive engine accessories through a reduction gear. The compound turbo-drive is located laterally of the cylinders in the region of the output end of the internal-combustion engine.

A compound turbo-drive of this general type is known from German patent specification 962,764. Here an exhaust-gas and re-expansion turbine are designed as axial flow turbines and are located in succession, adjacent and laterally of the engine cylinders in the longitudinal direction of the engine.

This arrangement requires a considerable space next to the internal-combustion engine. Moreover, because of this extended design, the possibility for mounting auxiliary units is restricted and it may be necessary to shift the location of these units.

An object of the invention is to develop a known compound turbo-drive it that it can be arranged in a space-saving way on internal-combustion engines with two cylinder banks arranged in V-form.

According to the invention, this object is achieved by an internal-combustion engine with two cylinder banks arranged in V-form and with a separate exhaust-gas turbocharger for each cylinder bank. The re-expansion turbine is designed with a double-flow turbine housing, located between the two exhaust-gas turbochargers, and is separately connected to the two exhaust-gas turbochargers by two respective inlet channels integrated in the turbine housing.

The invention ensures that the re-expansion turbine can be arranged between the two exhaust-gas turbochargers. This, in conjunction with the two exhaust-gas turbochargers, results in a compound turbo-drive arrangement which is located between the two cylinder banks of the internal-combustion engine and therefore is substantially symmetrically in relation to the longitudinal axis of the engine. A space-saving arrangement is obtained thereby, since the re-expansion turbine inserted between the exhaust-gas turbochargers does not take up any additional constructional space. Another advantage is obtained because the symmetrical arrangement of the compound turbo-drive allows the exhaust-gas lines leading from the two cylinder banks to the exhaust-gas turbochargers to be made of approximately equal length. This allows for a uniform loading for the exhaust-gas turbines.

By having the re-expansion turbine inlet channels guided away from the turbine housing in opposite directions and by having the exhaust-gas turbochargers flanged directly to these inlet channels through outlet flanges facing the re-expansion turbine housing, an especially compact design of the compound turbo-drive is obtained. Here the exhaust gases from the two exhaust-gas turbines of the exhaust-gas turbochargers are diverted into the re-expansion turbine along the shortest possible path and therefore without further energy losses. By having the exhaust-gas turbochargers and the re-expansion turbine form a single constructional unit which is supported on part of the crankcase through a flange to the gear casing of the reduction gear, it is possible to combine the constructional elements of the compound turbo-drive independently of the internal-combustion engine. During final assembly of the internal-combustion engine, this unit merely has to be mounted on at the intended location of the engine housing. This ensures an efficient assembly of the compound turbo-drive.

To ensure that the effective power obtained at the service turbine is transmitted to the crankshaft with the highest possible efficiency, it is advantageous if the gear casing of the reduction gear is supported directly on the crankcase, or on a control casing mounted on the crankcase. Advantageously, the necessary internal-combustion engine drive mechanism for driving the camshaft (or other auxiliary drives) can also be included in the transmission of the effective power train from the re-expansion turbine. This results in the reduction gearing being produced with a smaller number of gearwheel mechanisms. It is especially favorable if the reduction gear is meshed with the driving gearwheel of the camshaft.

Other objects, advantages and novel features of the present invention will become apparent from the following detailed description of the invention when considered in conjunction with the accompanying drawings.

BRIEF DESCRIPTION OF THE DRAWINGS

FIG. 1 shows a top view of an internal-combustion engine with cylinders arranged in V-form and with the compound turbo-drive according to the invention, and FIG. 2 shows the internal-combustion engine of FIG. 1 in a view from the output side.

DETAILED DESCRIPTION OF THE DRAWINGS

An internal-combustion engine 1 has two cylinder banks 2 and 3 arranged in V-form relative to one another. Two exhaust-gas turbochargers 4 and 5 are arranged on the output side of the internal-combustion engine 1 and at an axial distance from those cylinder banks 2 and 3. The exhaust-gas turbines 6 and 7 are connected to the individual cylinder banks 2, 3 via separate exhaust-gas lines 8 and 9. The exhaust-gas turbines 6, 7 each drive a compressor 10, 11, from which precompressed combustion air is fed to the cylinder banks 2 and 3 by means of a charge-air line 12. The impeller shafts 13 and 14 (represented by dot-and-dash lines) of the two exhaust-gas turbochargers 4 and 5 are aligned coaxially with one another and transversely relative to a longitudinal axis 15 of the engine. Furthermore, the two exhaust-gas turbochargers 4 and 5 are so arranged in relation to one another that the exhaust-gas turbines 6 and 7 are located inwardly between the two compressors 10 and 11. The exhaust gas coming from the two exhaust-gas turbines 6 and 7 is fed to a re-expansion service turbine 15. The re-expansion turbine 15 is arranged between the two exhaust-gas turbines 6 and 7 for receiving the two exhaust-gas streams from the exhaust-gas turbines 6 and 7 and is equipped with a double-flow turbine housing 16. The turbine housing 16 possesses two inlet channels 17 and 18 which extend in opposite directions and which are connected directly to the two outlet flanges 19, 20 of the exhaust-gas turbines 6 and 7 so that the exhaust gas passes from the exhaust-gas turbines 6 and 7 into the re-expansion turbine 15 along as short a path as possible.

The re-expansion turbine 15 is designed as a radial turbine. Its impeller shaft 21 (indicated by the dot-and-dash line 27) lies in the longitudinal mid-plane passing through the engine longitudinal axis 15 and transmits its delivered effective power to the crankshaft of the power unit of the internal-combustion engine 1 via a reduction gear 22. In order to achieve a transmission of the effective power with as few meshed gearwheels as possible and therefore with the highest possible efficiency, the reduction gear meshes with a driving gearwheel 24 which drives the camshaft 23 from the crankshaft (not shown). The driving gearwheel 24 is an integral part of a gearwheel transmission which drives the camshaft 23 and further auxiliary units (such as a fuel injection pump) by the crankshaft. The gearwheel transmission is mounted in a control casing 25 at the output end of the crankcase. The gearwheels belonging to the reduction gear 22 are supported in a gear casing 26 which is mounted on the control casing 25 via flange 25a in order to transmit the effective power from the re-expansion turbine 15 to the camshaft 23. The gear casing 26 thus extends between the two cylinder banks 2 and 3 and possesses a connecting flange on a side facing the re-expansion turbine 15, which has a complimentary flange that cooperates with the connecting flange. Thus the two exhaust-gas turbochargers 4 and 5 and the re-expansion turbine 15 are mounted to hang in a suspended manner.

The service turbine 15 can be equipped with a variable adjusting geometry (deflector) so that the deflector can be used for exhaust-gas throttling during engine braking. Thus there is no need for a special brake flap in the exhaust-gas line system.

The arrangement according to the invention is not restricted to the use of two exhaust-gas turbochargers and the advantages of the invention are also afforded if the re-expansion turbine is fed by only one exhaust-gas turbocharger.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A compound turbo drive arrangement for an internal combustion engine having a plurality cylinders arranged in first and second banks sloping downwardly and inwardly toward each other in a V-form, comprising:
    a reexpansion turbine arrangement having a double flow housing with first and second inlet ports integrated to said turbine housing and arranged at opposite ends thereof;
    first and second exhaust gas turbochargers connected to receive exhaust gases from said first and second banks of cylinders, respectively, said first and second turbochargers being arranged at opposite ends of said double flow housing adjacent said first and second inlet ports so that said reexpansion turbine is situated between said turbochargers, each of said turbochargers having an outlet port connected to an inlet port of double flow housing;
    reduction gear means coupled to an output of said reexpansion turbine for transmitting power therefrom to an accessory drive of said internal combustion engine;
    said compound turbo drive arrangement having said first and second turbochargers arranged laterally of said cylinders and being arranged at an output end of said internal combustion engine; and
    said exhaust-gas turbochargers and said reexpansion turbine being joined to form a single unit which is mounted to a gear casing of the reduction gear means and supported by a part of the crankcase of said internal combustion engine.

2. Compound turbo-drive according to claim 1, wherein the inlet channels extend away from the turbine housing in opposite directions; and
    wherein the two exhaust-gas turbochargers are mounted directly to the inlet housings by outlet flanges facing the turbine housing.

3. Compound turbo-drive according to claim 2, wherein the re-expansion turbine is equipped with adjustable deflector means for throttling the flow of exhaust gases through said turbine.

4. Compound turbo-drive according to claim 3, wherein during engine braking, said adjustable deflector means acts as a brake flap.

5. Compound turbo-drive according to claim 1, wherein the gear casing is supported on the crankcase at its output end, which receives a gearwheel transmission for driving an engine camshaft.

6. Compound turbo-drive according to claim 5, wherein the re-expansion turbine is equipped with adjustable deflector means for throttling the flow of exhaust gases through said turbine.

7. Compound turbo-drive according to claim 6, wherein during engine braking, said adjustable deflector means acts as a brake flap.

8. Compound turbo-drive according to claim 1 wherein the reduction gear is meshed with a driving gearwheel of a camshaft of the engine.

9. Compound turbo-drive according to claim 1, wherein the re-expansion turbine is equipped with adjustable deflector means for throttling the flow of exhaust gases through said turbine.

10. Compound turbo-drive according to claim 9, wherein during engine braking, said adjustable deflector means acts as a brake flap.

* * * * *